(12) United States Patent
Rothman et al.

(10) Patent No.: US 7,246,224 B2
(45) Date of Patent: Jul. 17, 2007

(54) SYSTEM AND METHOD TO ENABLE PLATFORM PERSONALITY MIGRATION

(75) Inventors: Michael A. Rothman, Puyallup, WA (US); Robert P. Hale, Portland, OR (US); John P. Lambino, Beaverton, OR (US); Mahesh S. Natu, Portland, OR (US); Vincent J. Zimmer, Federal Way, WA (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 10/951,277

(22) Filed: Sep. 27, 2004

(65) Prior Publication Data

US 2006/0074952 A1   Apr. 6, 2006

(51) Int. Cl.
*G06F 15/177* (2006.01)
(52) U.S. Cl. .................. 713/1; 713/100; 707/102
(58) Field of Classification Search ............. None
See application file for complete search history.

(56) References Cited

U.S. PATENT DOCUMENTS

| | | | |
|---|---|---|---|
| 5,606,693 A * | 2/1997 | Nilsen et al. ............... 707/10 |
| 6,442,685 B1 * | 8/2002 | French et al. ............... 713/100 |
| 6,557,008 B1 * | 4/2003 | Temple et al. ............ 707/104.1 |
| 6,598,057 B1 * | 7/2003 | Synnestvedt et al. ....... 707/200 |
| 2003/0204582 A1 * | 10/2003 | Shimoda et al. ............ 709/223 |
| 2004/0128203 A1 * | 7/2004 | Pierre et al. .................. 705/26 |

* cited by examiner

*Primary Examiner*—Thuan Du
(74) *Attorney, Agent, or Firm*—Joni D. Stutman-Horn

(57) ABSTRACT

An embodiment of the present invention relates generally to computer configuration and, more specifically, to a system and method to seamlessly determine the component configurations of a series of heterogeneous platforms and enable their respective component configurations to be intelligently migrated from one platform to another. In some embodiments, the invention involves generating configuration binaries for a plurality of target platforms. The configuration binaries are used with tools to create configuration directives for the target machines. In at least one embodiment, the configuration directives are sent to the target platforms in a scripting language. In some embodiments, the scripts are automatically generated by a tool using the configuration binaries for various platforms and policy guidance to determine which settings should be set on or off. Other embodiments are described and claimed.

27 Claims, 13 Drawing Sheets

Platform Model XYZ

| String Pack Language | ENG |
|---|---|
| String #1 | " Disable USB? " |
| String #2 | " Disable COM1? " |
| String #3 | " Disable COM2? " |
| String Pack Language | *NT (Neutral) |
| String #1 | " DIS_USB " |
| String #2 | " DIS_COM1 " |
| String #3 | " DIS_COM2 " |
| String Pack Language | NULL |

*Fig. 4A*

Platform Model ZYX

| String Pack Language | ENG |
|---|---|
| String #1 | " Disable USB? " |
| String #2 | " Disable COM1? " |
| String #3 | " Disable COM2? " |
| String Pack Language | *NT (Neutral) |
| String #1 | " DIS_USB " |
| String #2 | " DIS_COM1 " |
| String #3 | " DIS_COM2 " |
| String Pack Language | *HP (HPQ) |
| String #1 | " DISABLE_USB " |
| String #2 | " DIS_Serial1 " |
| String #3 | " DIS_Serial2 " |
| String Pack Language | NULL |

*Fig. 4B*

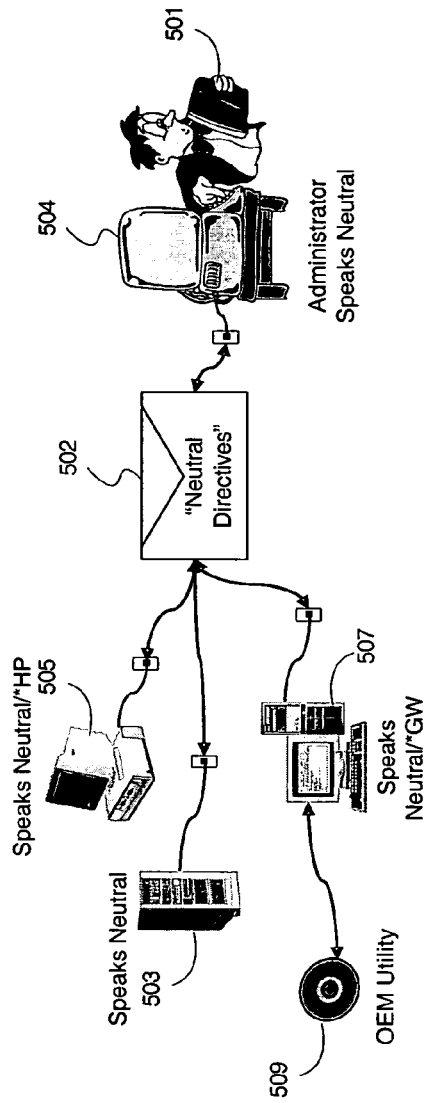

*Fig. 5*

Sample IFR Op-code encoding

SYSTEM AND METHOD TO ENABLE PLATFORM PERSONALITY MIGRATION

CROSS REFERENCE TO RELATED APPLICATIONS

This application is related to U.S. patent application Ser. No. 10/746,579, entitled, "System And Method To Seamlessly Enable Enhanced Management And Scripting Of A Computer System And Its Add-In Devices," filed on Dec. 24, 2003 by Michael A. Rothman, et al., assigned to a common assignee.

FIELD OF THE INVENTION

An embodiment of the present invention relates generally to computer configuration and, more specifically, to a system and method to seamlessly determine the component configurations of a series of heterogeneous platforms and enable their respective component configurations to be intelligently migrated from one platform to another.

BACKGROUND INFORMATION

Various mechanisms exist for administering the configuration of platforms in an enterprise. In corporate environments, or other network environments, such as ones administered by an information technology (IT) group, there are often times when it is desirable to turn on or off certain features in an administered platform. In one example, it may be desired to disable the universal serial bus (USB) port. However, some platforms may not have a USB port, so a command to disable the USB port would not be applicable for those platforms. In some platforms, this command may be an invalid request. Typically, existing systems use one agent to request these configuration changes with one or more remote targets. In existing systems, an administrator may communicate to one or several remote targets that are well known. However, the configuration request commands need to be hard-coded for individual platforms.

In one environment, a network may have 20 or more different SKU (stock keeping unit) platforms that need to be configured. Each individual SKU platform may require a different request protocol to disable the USB port. Thus, it may be desirable to migrate settings from one machine or set of machines to another machine or set of machines, or to have a server remotely configure and adjust configurations for many heterogeneous target platforms.

In existing systems, there has been no means of establishing a "standard" interrelationship between platform configuration settings of a variety of heterogeneous platforms. Therefore, if an administrator of a corporate network is faced with a large variety of systems with no standard means of configuring them, the administrator either would not "control" the firmware settings of the targeted platforms or if it is desired to control the various platform settings, a manual effort is necessary to establish a standard configuration for all the systems in the administered environment.

BRIEF DESCRIPTION OF THE DRAWINGS

The features and advantages of the present invention will become apparent from the following detailed description of the present invention in which:

FIGS. 4A-B show exemplary string pack languages which are understood by example platforms;

FIG. 5 illustrates an exemplary network where an administrator sends configuration directives to a heterogeneous set of clients, according to an embodiment of the invention;

DETAILED DESCRIPTION

Embodiments of the present invention include a system and method relating to migrating the personality of one or more systems to one or more target systems. In this context, a platform's "personality" may include the configuration settings of the platform, and other information required to define the "personality" of the platform. In at least one embodiment, the present invention is intended to enable easy migration of configuration settings to one or more target platforms. In an embodiment, the configuration settings are sent to a target platform using a scripting language as described in copending U.S. patent application Ser. No. 10/746,579, entitled, "System And Method To Seamlessly Enable Enhanced Management And Scripting Of A Computer System And Its Add-In Devices," filed on Dec. 24, 2003 by Michael A. Rothman, et al., and assigned to a common assignee. In an embodiment, configuration binaries are used to baseline a target platform's configuration settings.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
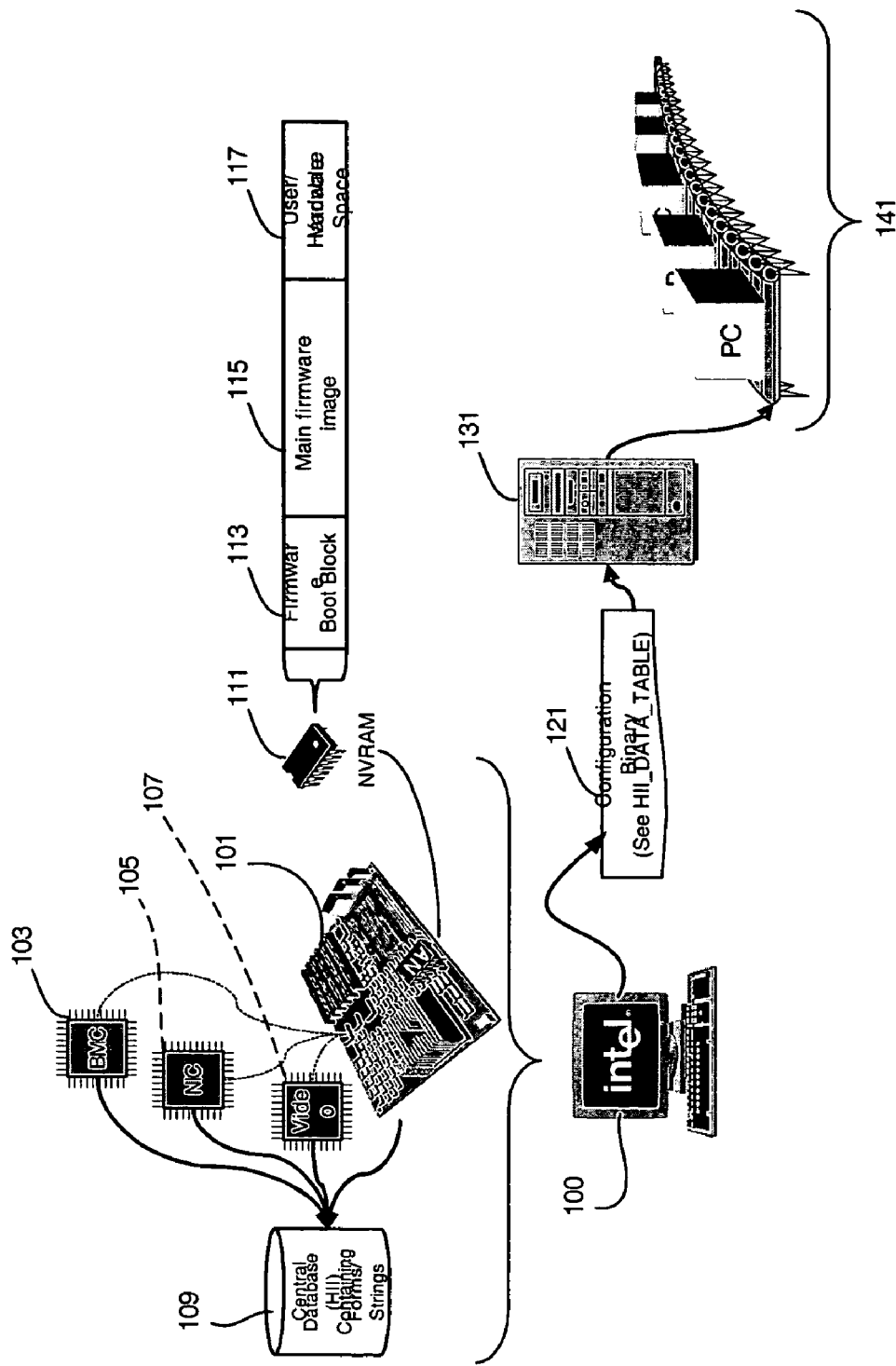
FIG. 1 is a block diagram illustrating an example of a platform to be configured using an embodiment of a personality migration technique.

FIG. 1 illustrates an example of a platform to be configured using a personality migration technique. A platform 100 may comprise a number of components including a motherboard 101, a baseboard management controller (BMC) 103, a network interface controller (NIC) 105, a video controller 107 and other devices (not shown). The platform may be communicatively coupled to a human interface infrastructure (HII) database (DB) 109. It will be appreciated that various database technology and/or distributed data storage techniques may be used to implement the HII DB 109. The HII DB 109 may store information regarding the configuration of the platform including internal representation forms (IFR) and language strings. The HII DB 109 typically has all of the information necessary regarding the strings and questions associated with the language construct. The HII DB 109 may also contain the information describing how one associates commands with the ability to save the commands to the platform. All pertinent configuration data typically resides in the HII DB 109. When a platform boots, a number of drivers controlling these components (103, 105, 107) may be loaded, including for the motherboard 101 itself. These drivers may contribute configuration information to the HII DB 109. The platform may have a non-volatile random access memory (NVRAM) 111 coupled to the motherboard which comprises a firmware boot block 113, a main firmware image 115 and a user/hardware variable space 117.

In an embodiment, configuration data may be extracted from a platform 100 to create a configuration encapsulation binary 121 (hereafter "configuration binary"). The configuration binary may be used to enable platform personality migration. The platform must typically be in a run state to capture the configuration binary 121 in this fashion. In an embodiment, the configuration binary 121 is sent to a configuration server 131 which contains a tool to interpret the configuration binary 121 to enable personality migration to a plurality of platforms 141.

If one does not have a separable configuration binary, one may have configuration data that is largely uncompressed. Typically the content in a firmware image is compressed. However, it will be appreciated some or all of the firmware image may be uncompressed.

Figure 2:
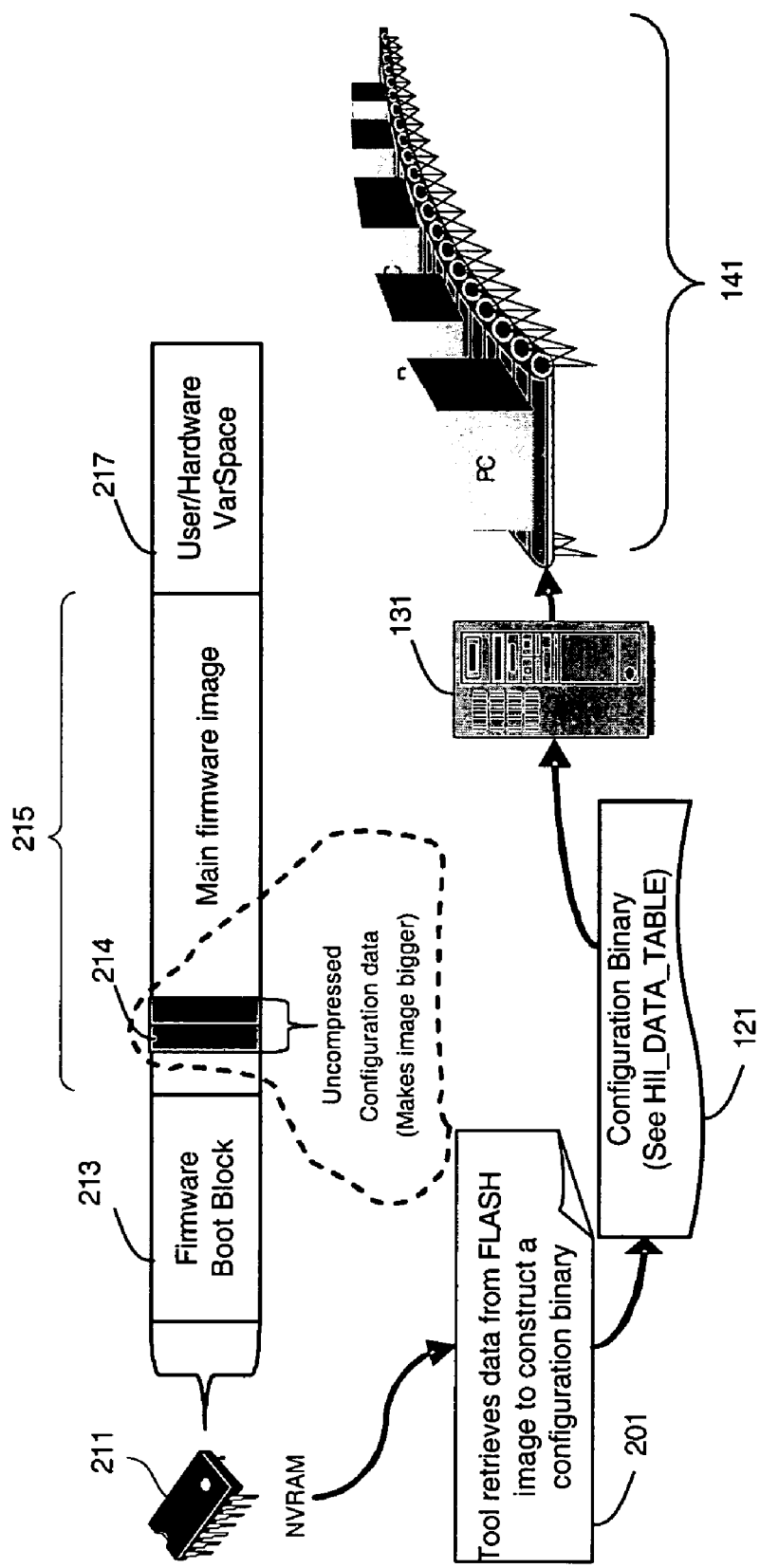
FIG. 2 shows an embodiment of FIG. 1 which utilizes non-volatile storage to hold uncompressed configuration data within the main firmware image.

FIG. 2 shows an embodiment of FIG. 1 which utilizes non-volatile storage to hold uncompressed configuration data within the main firmware image. A non-volatile random access memory (NVRAM) 211, typically a FLASH memory, comprises a firmware boot block 213, a main firmware image 215 and a user/hardware variable space 217. The main firmware image 215 is typically compressed. In an embodiment, the main firmware image 215 includes an uncompressed portion 214 comprising configuration data. A tool 201 may be used to retrieve the configuration data from the uncompressed portion 214 of the NVRAM 211. Once retrieved the configuration data may be reformatted into a configuration binary 121. As described above, the configuration binary 121 may be sent to a configuration server 131. The configuration server 131 contains a tool to interpret the configuration binary 121 to enable personality migration to a plurality of platforms 141 for delivery.

Figure 3:
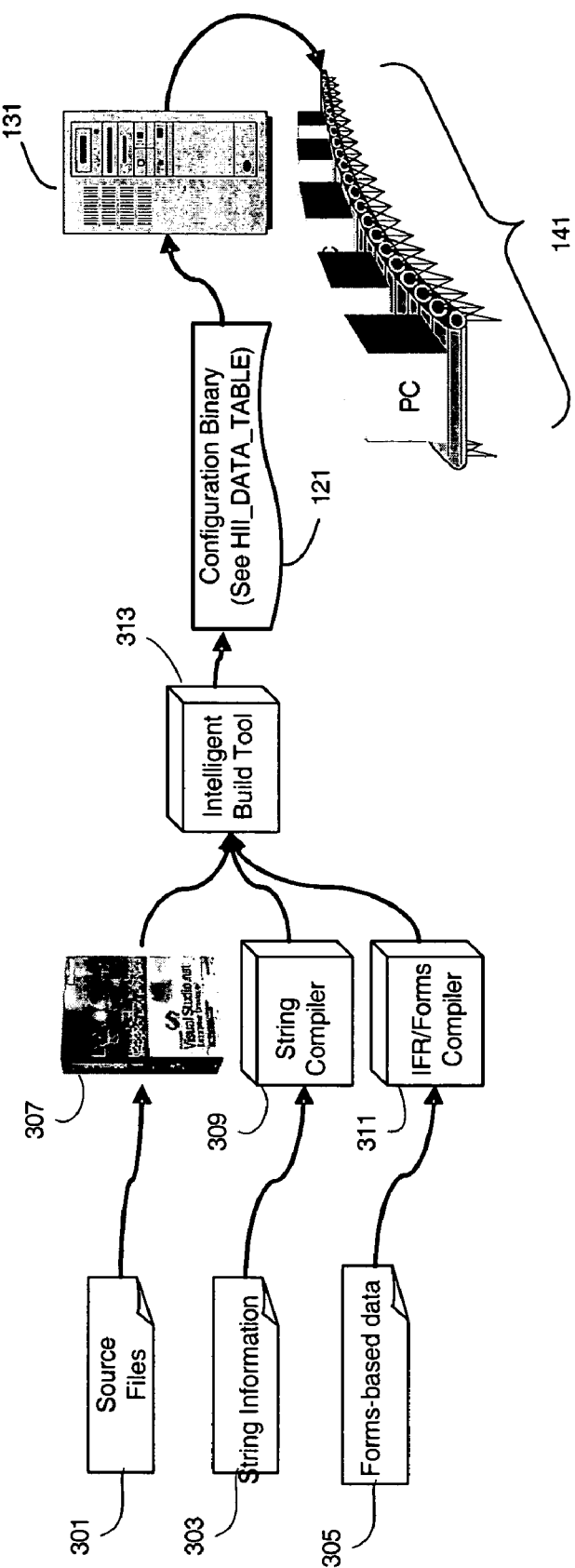
FIG. 3 shows an example of how a configuration binary may be constructed during a firmware build, according to an embodiment of the invention.

FIG. 3 shows an example of how a configuration binary may be constructed during a firmware build, in an alternative embodiment. This method is not dependant on FLASH images, or the machine itself (i.e., it is not necessary to run the machine to get the information). Source files 301, string information 303 and forms data 305 may be used to construct the configuration binary 121. Source files 301 may be written in a higher order language, such as C or Visual Basic, and be compiled by an off-the-shelf compiler 307 to provide input to a build tool 313. A string compiler 309 may be utilized to parse and decode string information 303 and provide the compiled string to a build tool 313. An internal forms representation (IFR)/Forms compiler 311 may be used to parse and compile IFR data 305 to provide input to the build tool 313.

In an embodiment, configuration data may be composed of internal forms representation (IFR) data. In this context, IFR encoding indicates whether a certain setting specifies a value to indicate the configuration of a device, or specifies an address with a numerical value associated with it, or specifies a value associated with a user password. These settings are all associated with a particular set of IFR data that have been created. The IFR usually carries default values created by the target platform developer. The IFR values may be associated with the current settings of the platform which are reflected either from a setup choice enabled by the platform user or possibly a remote administrator. The IFR data may also have string information associated with it. The use of IFR data provides a space-efficient means of encoding information to represent forms-based interactions. IFR abstracts string references via tokens. IFR also tracks configuration information, including the location to save configuration and programmatic default values for a given set of configuration options.

In existing systems the IFR construct is used to enable a user to switch among languages in a typical user interface (UI). ISO-3166 is a standard for describing a language in a three letter manner. For instance, "FRA" is French, "ENG" is English, and "CHN" is Chinese. Each displayed item is considered a "prompt." For instance, upon booting, a user may see a welcome screen in their chosen language. The welcome screen may display, "Hello, <username>, in English. If the system language is changed to Spanish, the prompt may be, "Hola, <username>. A global variable LANG is typically present to identify the current language. Regardless of the current language, the prompt during the welcome screen will have the same semantic meaning. A specific "prompt token" identifies which prompt will be displayed in the UI at a given time. At another point in system execution, the semantic meaning of the prompt token may be, "Do you want to disable serial port 2?" This prompt token will have corresponding prompts in all available languages. Existing systems use an IFR construct to store the various language prompts and their identifying tokens in a database. An embodiment of the disclosed method may extend this language construct with a scripting language, thus being able to build on existing methods for accessing the UI database.

In the past, IFR encoding has been a simple declarative encoding to describe presentation management/user-interface. At least one embodiment, as described herein, extends the IFR infrastructure to allow original equipment manufacturers (OEMs), independent hardware vendors (IHVs) and platform builders to dynamically affect policy and state variable update via interpretation or execution of IFR-based ensembles.

Scripting is a means by which configuration information may be extracted from a platform and correlated to a command. In some platforms, for instance, to turn on hyperthreading (HT), a specific offset at a certain memory location must be adjusted, or set. Each platform in the enterprise or network, may require a different protocol and syntax for a command to turn on HT. An agent, plug-in, or other process may be run on the target platform to read a scripting language and perform the requested configuration commands. Without a scripting capability, the target platform typically requires commands in the target platform's native format to be understood.

Embodiments of the system and method, as described herein, provide the ability to seamlessly integrate keyword definitions in the string infrastructure so that a script engine can associate a particular keyword with a given question or set of questions. This is achieved by the embedding of a language that is specific to the new keyword infrastructure which does not fall within one of the standard definitions for languages that the firmware currently honors. Each question will have an associated keyword language entry or series of entries which will enable the association of that question to a keyword, and thus enable the scripting of these keywords with a particular set of settings. Due to the ability for this infrastructure to be used both by the motherboard as well as add-in devices, and the ability to proxy non-volatile configuration data from add-in cards, one can achieve scripting ability on both system board and add-in cards.

In existing systems, records in a database contain a language code and an "Array of strings", where the strings are associated with prompt tokens for the UI. This construct may be extended to include records containing "keywords and values" for a scripting language. Thus, the functionality of the language construct is extended to include at least two different constructs in the same database space. During normal operations, the records containing a scripting language identifier, for instance, *SC, will not interfere with UI prompting and display because *SC will not be a default language for a system. Thus, the system will not erroneously try to display strings in the keywords and values records. During script parsing operations, a script engine has access to the prompt tokens and associated scripting language keywords and values via an existing record structure, typically stored in the HII DB.

In an embodiment, a neutral language is used for scripting. A neutral language may, for example, provide the scripting capabilities of the scripting mechanism described in U.S. patent application Ser. No. 10/746,579. A neutral language embeds configuration data in the string information on the target platform. A common terminology or protocol may be desirable to control a large heterogeneous set of targets and minimize complexity. One of the script keywords may, for example, be "HT_enable" as a means to dictate enabling hyperthreading. Setting this variable to TRUE and sending it to a target would enable the hyperthreading functionality of the target.

FIG. 4A shows string pack languages English and neutral scripting language (ENG 401 and *NT 403) which are understood by an example platform Model XYZ. FIG. 4B shows string pack language English, neutral scripting language and a platform-specific scripting language (ENG 401, *NT 403 and *HP 405) which are understood by an example platform Model ZYX. Thus, in this example, platforms XYZ and ZYX will both respond to directives written in the neutral language. Platform ZYX will further respond to platform-specific directives for the *HP language which may, for example, be used with an HPQ SKU platform.

FIG. 5 illustrates an exemplary network where an administrator sends configuration directives to a heterogeneous set of clients. The ability for heterogeneous platforms 503, 505 and 507 to act on the incoming configuration directives from a remote administrator 501 is based at least in part on the ability to understand the language in which directives are constructed. Multiple platform groups or original equipment manufacturers (OEMs) may not agree on a single namespace to represent the language that configuration directives will be transmitted in. Since a heterogeneous set of targets will likely use a multitude of configuration directive formats, it may be impractical for an administrator to send directives in a large variety of languages.

In this example, the administrator sends directives 502 in a neutral language via a configuration server 504. It will be apparent to one of ordinary skill in the art that in some embodiments, these directives may be automatically generated without operator intervention. The configuration server 504 may not have platform-specific knowledge, which can vary based on firmware revisions, as well as platform SKU changes. Thus, in some embodiments it is desirable to put the platform-specific intelligence in the target platforms themselves. To enable a solution that allows for a server to communicate with a heterogeneous set of targets, a common ("platform neutral") language 502 which all target platforms will understand may be utilized. Using a neutral language allows for a configuration server to generate a single set of commands in the neutral language and distribute one set of commands to the target platforms. In this example, Platform 503 understands the neutral language; and Platforms 505 and 507 understand both the neutral language and their respective platform-specific languages.

There may be a case where a platform vendor may choose to support some OEM-specific languages, due to the volume of pre-existing utilities that reference certain keyword context data. For interoperability, a platform may support neutral and OEM-specific languages so that the pre-existing utilities operate in their normal fashion while the platform is also capable of using personality migration in a reasonable fashion. In an embodiment, Platform 507 may have an OEM utility 509 that still uses the legacy OEM-specific language names that were developed.

The target platforms understand the neutral language and register the configuration directives and potentially transform their directives into their own platform-specific directives. Some platforms on the network may not understand the neutral language. In an embodiment, the configuration server may commingle neutral language directives with platform-specific directives in a single command stream.

One of the goals for configuring remote platforms is the ability to have a common means by which one can send the configuration directives to the targets. The directives themselves should follow a fairly simple premise. For instance, the directives may enable a text file to act as a script for the configuration changes. The text file should be simple enough to easily use and edit (possibly use Unicode strings). The text may be self describing so that an administrator has the flexibility of sending both neutral and OEM value-added directives.

Figure 6A:
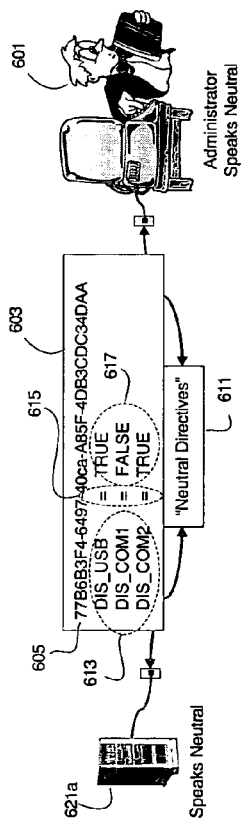
FIGS. 6A-C show example configuration requests sent by an administrator, according to embodiments of the invention.

FIG. 6A is an example of a simple configuration request 603 from an administrator 601 to a target platform 621a. It may be noted that the first line of the configuration request 603 shows a globally unique identifier (GUID) 605. This GUID 605 should correspond to the configuration language that the target platform is supposed to apply the incoming directives 603 against. In this example, the GUID corresponds to neutral language directives 611. The intent in the illustrated embodiment is to minimize the amount of transmitted text; therefore the target platform assumes that unless another GUID occurs somewhere in the text script to change the language, all commands will be based on the language described in that first GUID. In the example, it can be seen that the commands are organized fairly simply with a keyword 613, an equal sign 615, and a parameter 617.

Figure 6B:
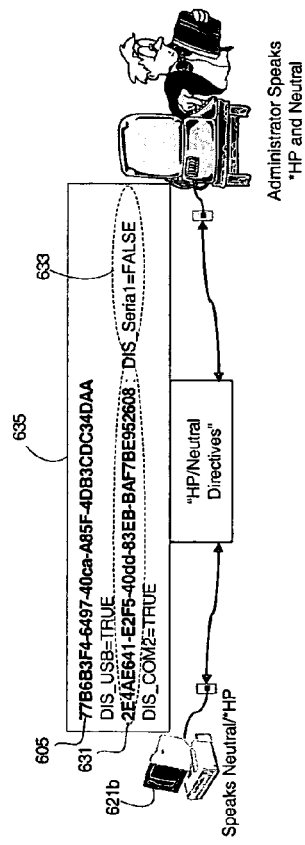

In FIG. 6B, there is shown a slight modification associated with the communication data of FIG. 6A. An alternative embodiment allows the default GUID 605 to be temporarily overridden by a GUID 631. In this example, in the third line of the directives a GUID 631 is associated with the example configuration language of "*HP". The GUID 631 is followed by a ":" and immediately afterwards a configuration directive 633 in the *HP language. In this way, temporary overrides are enabled in certain cases where an OEM might have some additional directives that are otherwise not described in the neutral language. In some embodiments, no neutral language directives are included in the configuration directive communication stream at all. One or more platform specific directives may be intermingled as default language and temporary language syntax to accommodate all platforms on the network that are to be configured. The target platform should be able to disambiguate between these directives and act appropriately only on those directives it understands. It should be noted that in an embodiment, immediately following the temporary GUID override, the default GUID language is resumed, in this case, the neutral language-based configuration directives. It should be noted that if a GUID appears in the text without the following ":", the default language changes to the language identified by this GUID for the remainder of the script unless another GUID appears in the text to supersede it.

Figure 6C:
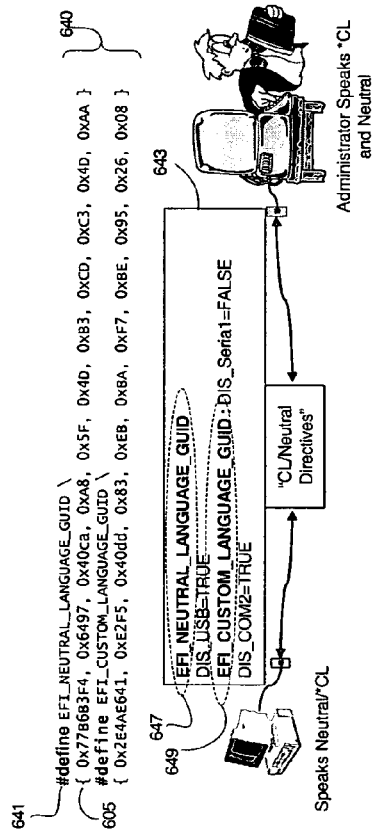

FIG. 6C shows an exemplary syntax 640 for correlating numeric GUIDs with variable names, or aliases. Just as one might have a standard GUID 605 to define the language, a #define 641 (or equivalent definitional statement) may be associated with this GUID 605 and may become the standard mechanism for communicating this data in the Unicode-based scripts. Since manually entering a GUID accurately is fraught with possibilities of transcription error, this solution lends itself well to situations where a command-line might be active and a user manually types in directives or someone would otherwise be transcribing a GUID into a script file. It may be seen that the configuration directives 643 are equivalent to the configuration directives 635 of FIG. 6B.

"77B6B3F4-6497-40ca-A85F-4DB3CDC34DAA" 605 identifies the configuration language used for the subsequent configuration commands. Because each platform may use its own unique language, many valid GUIDs may exist to define the configuration language. In some embodiments, as shown in FIG. 6C, a simplified identifier is used to indicate the configuration language, such as, "EFI_NEUTRAL_LANGUAGE_GUID" 647. The simplified identifier may be put into a table, file or other method to decode the identifier and retrieve the GUID. To override the default language for the command stream, an alternate identifier, such as EFI_CUSTOM_LANGUAGE_GUID 649, may be used in the following syntax::

EFI_LANGUAGE_GUID_No2:<custom_command>, where the identifier is followed by a ":" and then by the appropriate command.

A target platform may ignore commands which are not in a language understood by the platform. The platform acts on the commands it understands.

Figure 7A:
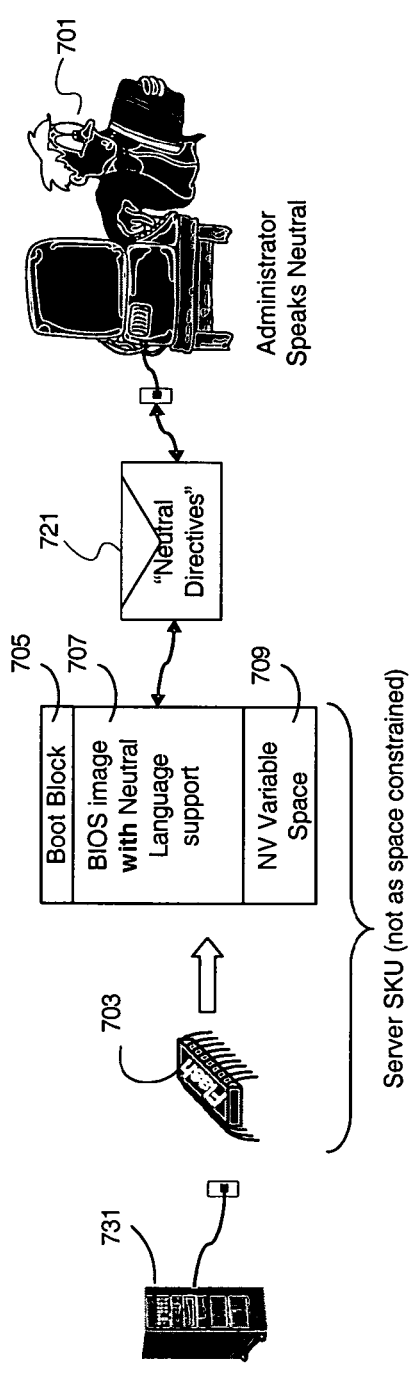
FIGS. 7A-B illustrate examples of two alternative FLASH image profiles, according to embodiments of the invention.
Figure 7B:
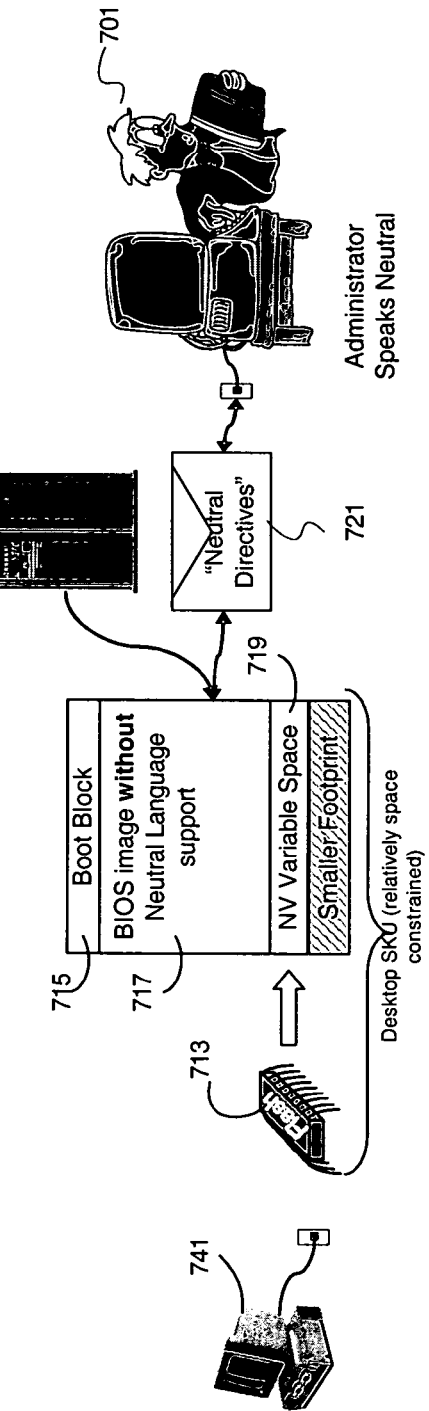

Based on the platform resources, the configuration language support may be contained within the FLASH image or may be retrieved from an alternate non-volatile storage location (e.g. a configuration server). FIGS. 7A and 7B are an illustration of two FLASH image profiles.

In an embodiment, inventory information may be requested. For instance, the command may request the media access control (MAC) address, or identification of firmware version running. If the platform understands a command it will act upon it.

In a deployment, there may be 1000 machines on the subnet with which one needs to communicate. Some platforms may not directly support some aspects of personality migration because they have very restrictive FLASH cards. This is acceptable, but there will need to be alternate means to configure these platforms. Some SKUs of BIOS machines may not have neutral language support, but may pull the neutral language support down from an alternate location, i.e., a configuration server after booting.

In one embodiment, as shown in FIG. 7A, a server has sufficient FLASH 703 to support a configuration language. In this case, the FLASH may comprise a boot block 705, a BIOS image with neutral language support 707, and NV variable space 709.

In this embodiment, the administrator 701 sends configuration directives 721 to target(s) 731. The directives 721 are interpreted by the platform 731 and then acted upon (e.g. change configuration settings).

In FIG. 7B, a desktop SKU does not understand the configuration language, which may or may not be in the neutral language. In this case, the FLASH 713 may comprise a boot block 715, a BIOS image without neutral language support 717, and NV variable space 719. In the embodiment, the administrator 701 sends configuration directives 721 to target(s) 741. The directives 721 are interpreted by the platform 741 and then acted upon (e.g. change configuration settings). However, if a language directive is not understood, the platform may optionally retrieve the language-specific string pack for that platform from a server 751. Thus the platform may have a smaller footprint and yet utilize the same functionality.

Figure 8:
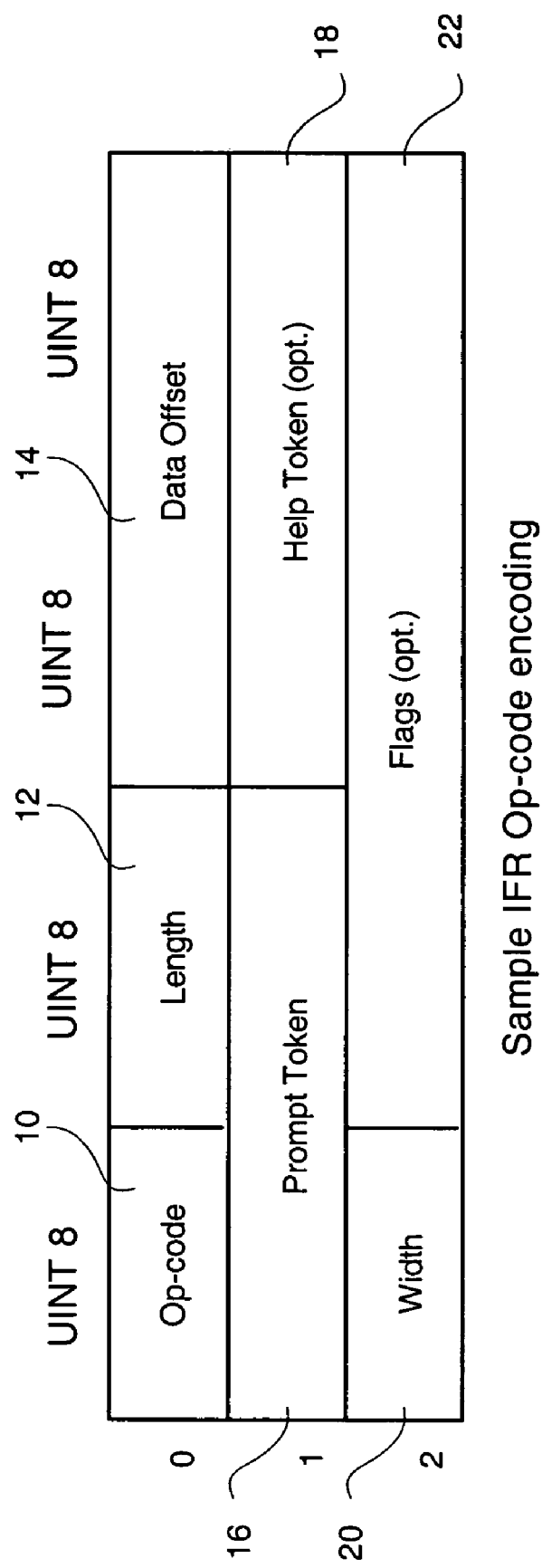
FIG. 8 illustrates an exemplary internal forms representation (IFR) op-code encoding, according to an embodiment of the invention.

FIG. 8 illustrates an exemplary IFR op-code encoding. In this example, the op-code comprises three words of data. The first word comprises an op-code 10, a length 12 and a data offset 14. The second word comprises a prompt token 16 and a help token 18. The third word comprises a width field 20 and flags field 22. The help token field 18 and flags field 22 are potentially optional with regards to the disclosed system and method. They may have no direct correlation to the enabling of scripting. The help token field 18 and flags field 22 are shown to illustrate a "typical" IFR entity.

However, similar to a prompt token as a reference to a string value that illustrates a "question" such as "Do you want to disable serial port 2?", the help token is a UI construct that is a reference to a string value that would illustrate if there were help associated with the question being asked. For instance, a user may be able to press a context sensitive function key to access a help field associated with the current operation, such as "By disabling your serial port, you will not be able to plug items into the serial port and expect them to work appropriately."

The width field 20 defines the size of the configuration data being stored. For instance, if the value associated with the question "What is your Serial Port address?" were to be 0x3F8, the width must be 2. Width defines the number of bytes that are stored in the non-volatile configuration storage. Therefore, when one extracts data, one needs to know how much to retrieve to properly understand the current setting for the given question.

The flags field 22 is a UI construct which directs the internal UI browser to behave in certain ways versus others. The flags field 22 is not used in the disclosed embodiments.

Figure 9:
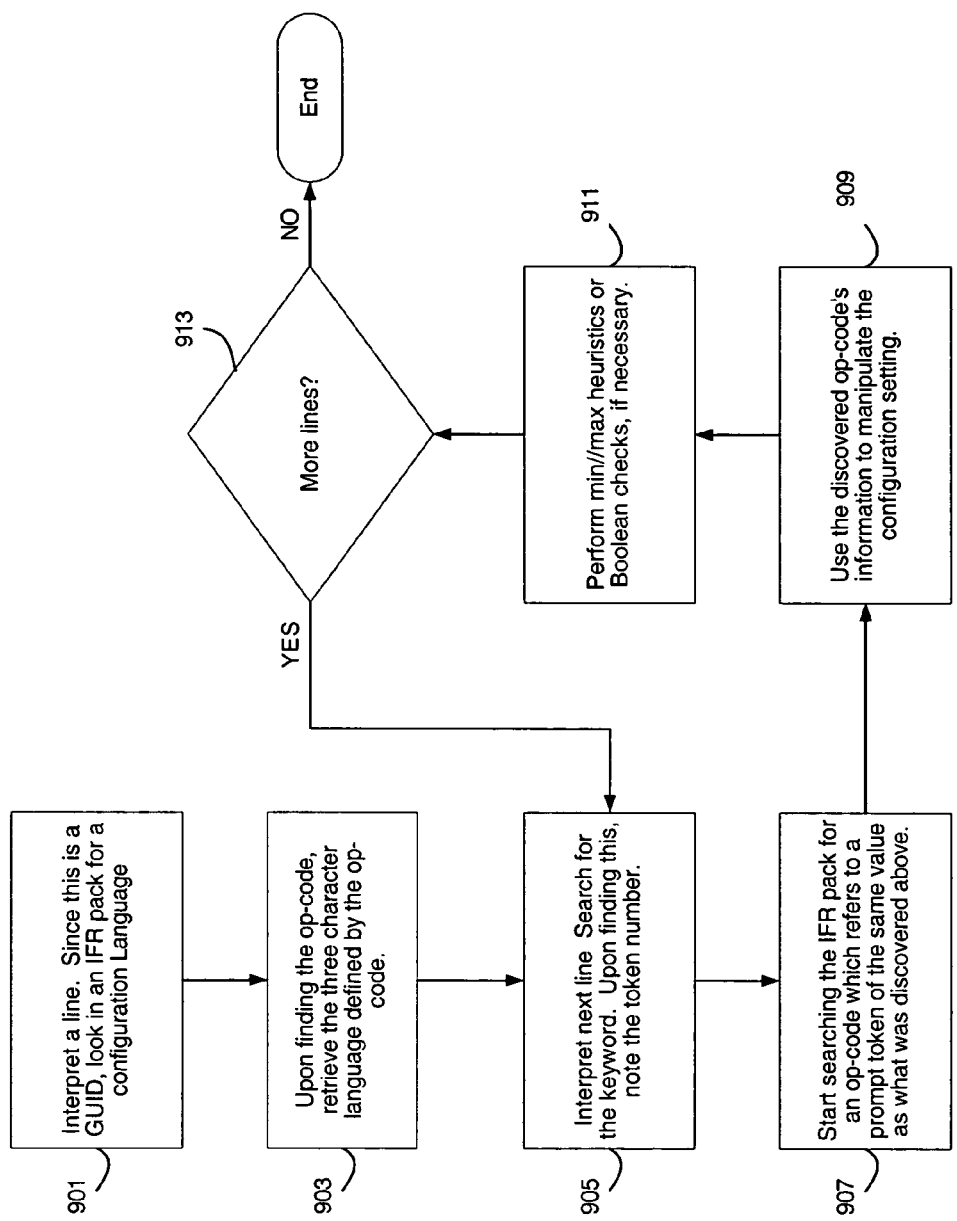
FIG. 9 illustrates an exemplary process to parse a configuration directive using the construct as illustrated in FIG. 8.

An exemplary process to parse a configuration directive is illustrated in FIG. 9 and uses the construct as illustrated in FIG. 8. This exemplary process is described in the context of the configuration directives shown in FIG. 6A (603). It will be apparent to one of ordinary skill in the art that modifications to this process may be performed to accommodate changes in implementation and the contents of the configuration directives. The first line of the directives is interpreted in block 901. Since this line contains a GUID, the IFR pack is searched for a configuration language op-code.

Upon finding the op-code, the three character language defined by the op-code is retrieved in block 903. For instance, a neutral language may have a language code of "*NU". A particular model of a Hewlett-Packard platform may have a language code of "*HP". It will be apparent to one of ordinary skill in the art that any three letter code may be used to identify the configuration language code, as long as that code is not used for one of the spoken languages understood by the platform, and used for the UI. Future operations will be based on this retrieved string pack language.

Once the language has been determined, the actual directives may be interpreted and acted upon. The next line (first keyword directive) is interpreted in block 905. In this exemplary example, the first keyword (see FIG. 6A) is "DIS_USB" in the directive "DIS_USB=TRUE." This directive intends to disable the USB port of the platform. The keyword "DIS_USB" is searched for in the HII DB. Upon finding the keyword, the token number is noted.

Once the token number of the keyword is found and noted, the IFR pack is searched for an op-code which refers to the token number in block 907. Information related to the op-code is retrieved to be used to determine what operations must be performed in block 909. For instance, the op-code may have a related data offset that specifies where in NVRAM the configuration data is to be mapped and manipulated. The platform driver may use the op-code information to manipulate the configuration setting.

In some embodiments, the op-code may have min/max heuristics as part of its encoding. These heuristics are honored and the surrounding op-codes may apply Boolean checks in block 911. For instance, a particular setting may have a minimum valid value of "10" for a given platform, while its maximum valid value may be "25". In this case, the incoming request that might be valid for most systems to change the setting to "30" may be invalid for this platform and may be duly ignored by the platform. In an embodiment, a platform-based policy may be enacted to handle this Boolean check. This validation allows for platforms to ensure that what they are being requested to do would still be within the confines of a "legal" configuration regardless of what an external agent would attempt to ask for.

If there are more lines of data, as determined in block 913, then the process continues at block 905 to interpret the next line of directives. If there are no more lines, the process ends.

In an alternative embodiment, as illustrated in FIG. 6B, a one line GUID override may exist in the directive stream. In this example, the process as described above is modified somewhat. When the GUID is identified in block 901, it is determined that a keyword directive immediately follows the GUID due to the existence of the ":" after the GUID. In this case, the keyword appearing on this line is interpreted, rather than reading the next line. Further, if a GUID line has been read and interpreted already, once this temporary GUID and keyword pair are processed, the original GUID is used to identify the directive language for subsequent keywords. In other words, the GUID/keyword pair is only a temporary override. In another embodiment, a new GUID appears to identify a new default language. In this case, processing would begin with block 901, because a default GUID has been found.

One embodiment of the invention requires the platform to be up and running to be able to get the configuration information. In another embodiment, during the firmware build process, configuration data is saved in a configuration binary. Information in the configuration binary include: source files for the firmware; associated internal forms representation (IFR) or binary encoding that gets built with the firmware build; associated string information, etc. The binary reflects what would normally be stored in the HII DB regarding configuration information. The configuration binary may not reflect a current state of the machine, but may reflect the factory defaults.

A vendor may execute the firmware build and extract the configuration data. This configuration data may be supplied in advance to a customer. The customer may then customize the configuration using the a remote system, for instance a laptop computer, prior to delivery of the firmware/platforms. The customer may easily reconfigure the platforms when they are received using the modified configuration data. Thus the personality migration may be used at a manufacturing/delivery level, as well as an information technology (IT) or system administration level.

Figure 10:
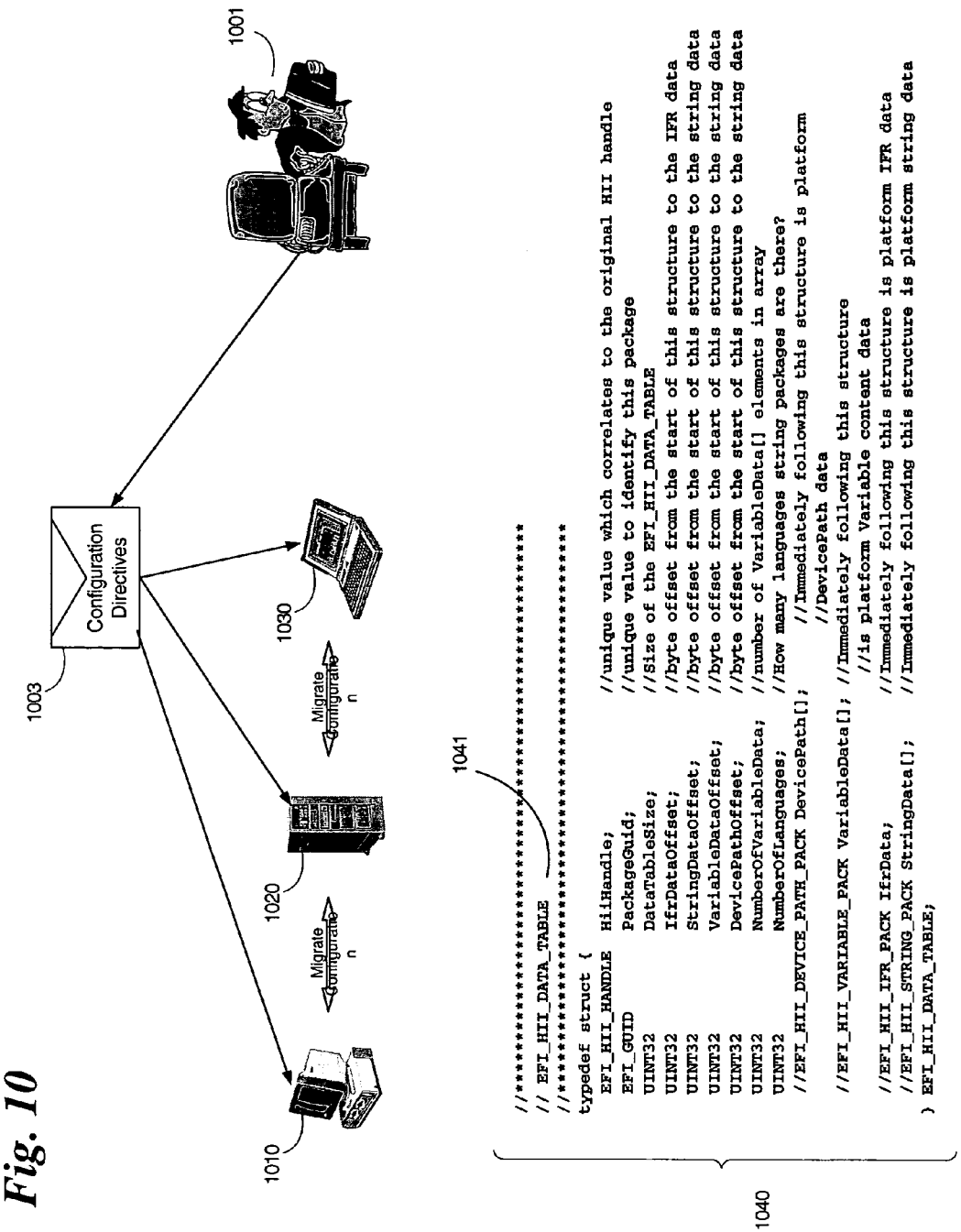
FIG. 10 illustrates an embodiment of personality migration where the migration is from one platform to another.

In an alternative embodiment, personality migration may be performed from one platform to another. FIG. 10 illustrates an embodiment of migration where the migration is from one platform to another. There are three platforms in this example: desktop 1010, server 1020, and laptop 1030. In one example, the server 1020 sends setting to the desktop and laptop. Other scenarios are possible. An administrator 1001 may edit a single text file to configure multiple platforms. An example structure file to configure both the desktop platform 1010 and the laptop platform 1030 appears at 1040.

The EFI_HII_DATA_TABLE structure 1040 is an encapsulation description of information that may be contained in a configuration binary. Given sufficient portable data (configuration binary) regarding target platforms, an administrator, configuration server or peer configurer may determine a valid set of data to send to the target and attempt to clone or propagate settings from one machine to another. One problem about "copying exact" is that one cannot allow exactly the same setting for certain aspects of the platform, such as the target's MAC address which is supposed to uniquely identify the machine on the network. Therefore, by using a platform's default or current configuration data such invalid duplication may be avoided. Configuration settings may then be migrated from one set of machines to another without worry of bad data being inserted. The structure 1040 illustrates the potential contents of the configuration binary. One machine can query another for its configuration binary encapsulation (EFI_HII_DATA_TABLE) data which the target machine may generate and send to the requester. The requester can then turn around a set of directives which are compatible with the target platform's capabilities without violating any of the target platform's rules or accidental duplication of things that should otherwise be unique.

By enhancing the build process to analyze the components of a firmware-base, one can create a configuration binary to enable personality migration and intelligently determine a platform's capabilities. A configuration tool may derive factory defaults for a given platform based on the build sources. This method for extracting configuration information may be done without increasing FLASH memory, nor does it require a copy of the hardware to create the configuration binary. A configuration binary extracted in this way allows the settings of one platform to be migrated to heterogeneous targets and avoid issues such as duplicate MAC addresses and similar problems.

Figure 11A:
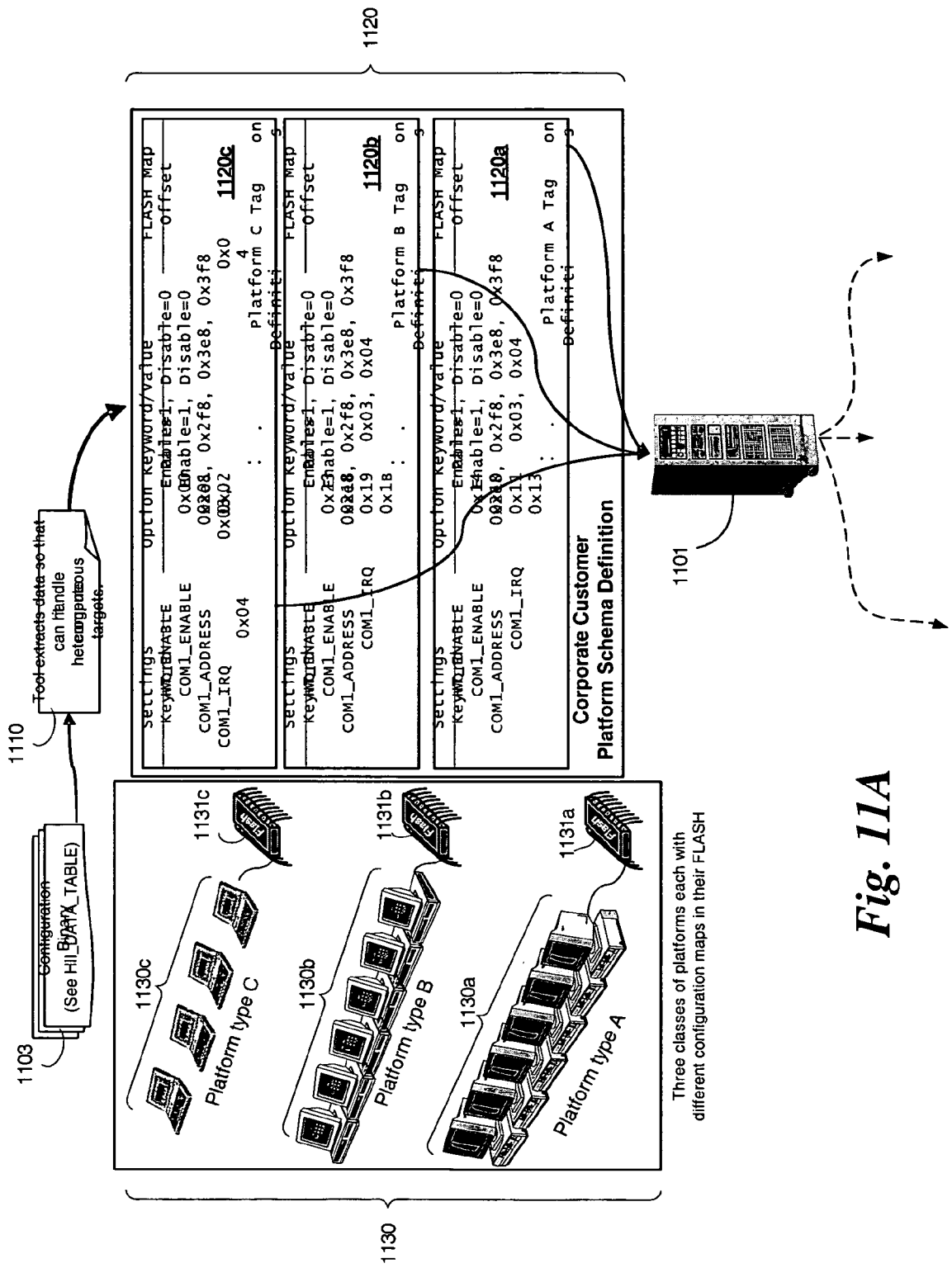
FIGS. 11A-B show an exemplary schematization of the configuration information, according to an embodiment of the invention.
Figure 11B:
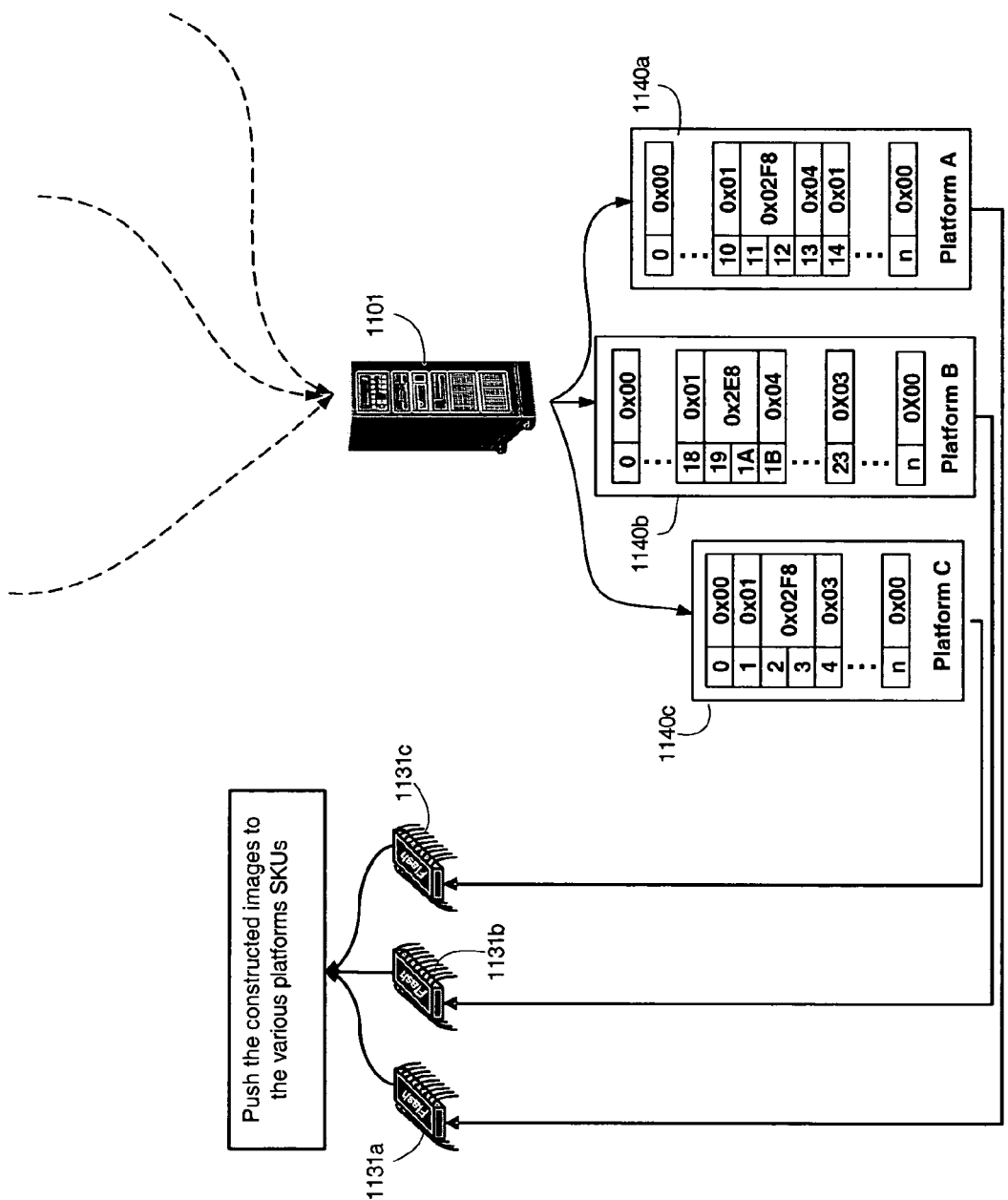

FIGS. 11A-B show an exemplary schematization of the configuration information. A configuration binary tool 1110 may extract data to handle heterogeneous target platforms 1130. A server 1101 may have many configuration binaries for many different machines. In one example, there may be 20 different SKUs of interest. Thus, there may be 20 different configuration binaries each one representing a different SKU platform. A schema 1120 may be constructed for each SKU 1130 so that an automated tool is able to generate the appropriate configuration directives for each SKU. The administrator might request, for instance, HT_Enable=TRUE and the schema for HT_Enable may automatically be translated to the appropriate command for each SKU, according to the schema 1120. The commands are put into a script that may be sent to many target platforms.

Three SKUs of platforms are shown 1130a-c. Each SKU has a platform schema definition. Platform schemas are a means of automating platform configuration. The server 1101 reads the definition data 1120 for each SKU of a platform and based on the desired configuration, configuration settings 1140 are constructed in the appropriate FLASH map format. The configuration settings 1140 may then be loaded into the respective platform FLASH 1131. Thus an administrator only needs to enter a set of keyword, or desired configuration once and the configuration tool 1110 automatically generates FLASH configuration settings 1140 for targeted platforms 1130. It will be apparent to one of ordinary skill in the art that desired configurations may be predetermined and stored in the configuration server or other location and be automatically associated with the platform schema and sent to the target platforms without user intervention.

Figure 12A:
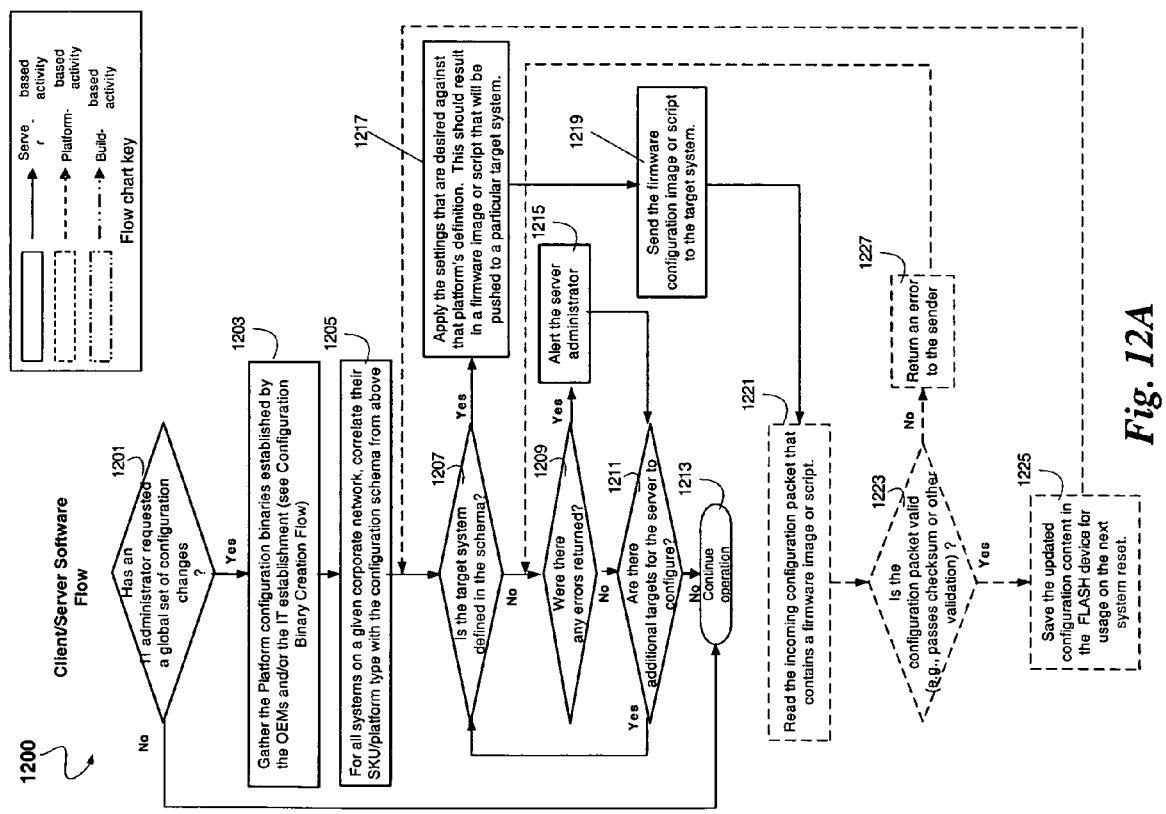
FIGS. 12A-B show a flow diagram of an exemplary process for personality migration, according to an embodiment of the present invention.
Figure 12B:
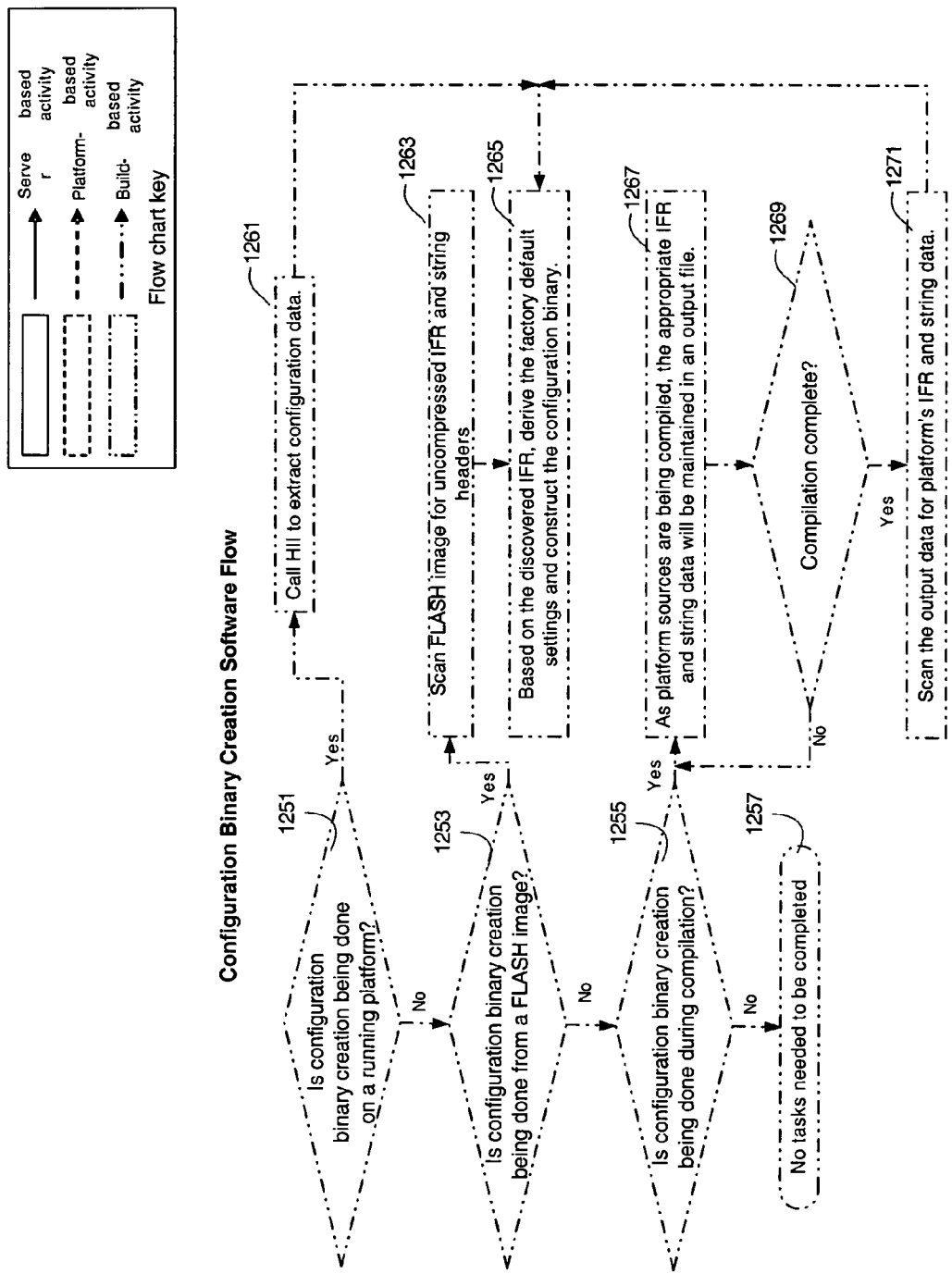

FIGS. 12A-B illustrate an exemplary process for personality migration, according to an embodiment of the present invention. FIG. 12A is directed to client/server aspects of a process 1200 and FIG. 12B is directed toward creation of a configuration binary. The process blocks are configured to easily indicate to which portion of the overall process they relate. For instance, server based activity is indicated by a solid line. Platform activity is indicated by a broken line. Build-based activity is indicated by a broken line interspersed with double dots.

In 1201 it is determined whether a global set of configuration changes has been requested. If not, then the process continues operations at 1213. In other words, the process waits for an indication that a global set of configuration changes is desired. If so, then the platform configuration binaries established by the original equipment manufacturers (OEMs) and/or the IT establishment are gathered in 1203. The flow chart in FIG. 12B outlines an exemplary method for creating configuration binaries.

For all systems on a given network, or in a given enterprise, the SKU/platform type is correlated with a configuration schema, as described in FIGS. 11A-B, in block 1205. The administrator may want to broadcast the configuration changes to all SKUs on the network. In other cases, only a certain class of platforms are targeted.

A determination is made as to whether the target system is defined in the schema in block 1207. If so, then the settings to be modified for that platform's definition are applied in 1217. This may result in a firmware image that will be pushed to a particular system. In another embodiment, a script is sent instead of a firmware image. The configuration image or script is then sent to the target system in block 1219.

If the target system was not defined in the schema, as determined in 1207, then it is determined whether an error was returned in block 1209. If so, then the server administrator may be alerted in block 1215. If there were no errors returned, then it is determined whether there are additional targets to be configured in block 1211. If not, then operations continue at block 1213 until a configuration is required. If more targets are to be configured, it is determined once again whether the next target is defined in the schema at block 1207. Each desired target is ultimately configured in this processing loop.

On the target side, each target receives its configuration packet, in turn, in block 1221. In one embodiment, the packet comprises a firmware image. In another embodiment, the packet comprises a configuration script. The target system determines whether the configuration packet is valid in block 1223. In some embodiments, the validation utilizes a checksum technique. It will be apparent to one of ordinary skill in the art that many validation schemes may be used to accomplish similar results. If the packet is not valid, an error may be returned to the sender, in block 1227. If the packet is valid, the updated configuration content may be saved in FLASH device for usage at the next system reset, in block 1225. If the configuration updates have been sent in the form of a script, then the script may be parsed and processed before saving the configuration changes to the FLASH.

FIG. 12B shows an exemplary process for creating a configuration binary. If a platform supports creation of configuration binaries as determined in block 1251, the human interface infrastructure (HII) database may be called to extract the configuration data in block 1261. If the platform does not support creation of configuration binaries, for instance, when the platform is not running, a determination is made as to whether configuration binary creation is to be performed from a FLASH image, in block 1253. If the information is to be retrieved from FLASH, then the FLASH image may be scanned for uncompressed IFR and string headers in block 1263.

In either case, the configuration information is now gathered from either the HII DB or the FLASH. Based on the discovered IFR, the factory default settings may be derived in block 1265. The configuration binary is then constructed from the factory defaults or saved defaults from the HII DB. The configuration binary is generated in a binary file format consistent with the structure as defined by EFI_HII_DATA_TABLE 1040.

If the configuration binary is not to be constructed from the FLASH image, then it is determined whether the configuration binary is to be created during firmware compilation, in block 1255. If not, then no configuration binary needs to be generated. If so, then as platform sources are being compiled, the appropriate IFR and string data are maintained in an output file in block 1267. If the compilation is complete, as determined in 1269, the output data is scanned for the platform's IFR and string data in block 1271. If the compilation was not complete, then additional sources are compiled and IFR and string data maintained in block 1267. Once the compilation for all sources has been completed, and the output data has been scanned in 1271, the configuration binary is constructed in block 1265.

The configuration binary, from a server's perspective, enables schemas describing the target platforms to be more easily generated. The schemas may be used to auto-generate scripts. The administrator may not be conscious of which systems are on the networks. Configuration binaries may be collected and then used to generate the schemas. The administrator may use an interface where the desired configuration changes are selected at an abstract level and the scripts are generated based on knowledge of the platform's default configuration and knowledge of scripting languages.

A server may query a remote platform at any time and extract the equivalent of configuration binary data from the platform. With a collection of configuration binaries illustrating the types of supported platforms and their associated configuration languages, a tool may parse through the collected binaries to extract the supported configuration languages, the minimum/maximum or heuristic information, etc., and automatically generate scripts which may be targeted toward a specific set of target platforms. The script may be compatible with many or all of the configuration target platforms. These automatic scripts may be formatted as described above using GUIDs to identify the language, to be capable of embedding a variety of language settings in a single script. In addition, a server-based tool may provide a user-interface which integrates the extracted data to properly reflect the target platform topology and make it easy for the administrator to interact with the heterogeneous set of target platforms.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   correlating each of a plurality of platform types with information in a configuration schema;
   generating a set of configuration directives for the plurality of platforms using the correlated configuration schema and a set of configuration policies; and
   sending the set of configuration directives to the plurality of platforms, wherein the set of configuration directives is constructed to allow a platform to interpret directives that are understood by the platform and ignore directives that are not understood by the platform.

2. The method as recited in claim 1, wherein generating a set of configuration directives comprises:
   collecting a configuration binary for each of the plurality of platform types;
   determining for each configuration policy a syntax corresponding to each of the plurality of platform types using the configuration binary corresponding to the platform type; and
   creating a set of configuration directives comprising directives constructed in at least one platform syntax language.

3. The method as recited in claim 1, wherein a format of the set of configuration directives is selected from a group of formats comprising a firmware image, a heterogeneous scripting language, a custom scripting language, and a combination of scripting languages.

4. The method as recited in claim 3, wherein the combination of scripting languages is capable of temporarily overriding a default language during interpretation for a single directive in another scripting language.

5. The method as recited in claim 4, wherein a globally unique identifier (GUID) indicates which scripting language is used for a corresponding configuration directive in the set of configuration directives.

6. The method as recited in claim 1, wherein the set of configuration directives is constructed to enable a target platform to download language support from a remote location in order to interpret the configuration directives.

7. The method as recited in claim 1, wherein the set of configuration directives is constructed to enable a target platform to interpret the configuration directives using a scripting agent which uses information in a human interface infrastructure database (HII DB).

8. The method as recited in claim 1, wherein the configuration binary for a platform type is constructed from uncompressed configuration data in a main firmware image corresponding to the platform type.

9. The method as recited in claim 1, wherein the configuration binary for a platform type is constructed during a firmware build process for the platform type.

10. The method as recited in claim 9, wherein constructing the configuration binary during the build comprises at least one input selected from a group consisting of source files, string information and forms-based data, wherein source files are compiled using a source language compiler, string information is compiled with a string compiler, and forms-base data is compiled with a forms compiler.

11. A machine accessible storage medium having instructions that when executed cause the machine to:
correlate each of a plurality of platform types with a information in a configuration schema;
generate a set of configuration directives for the plurality of platforms using the correlated configuration schema and a set of configuration policies; and
send the set of configuration directives to the plurality of platforms, wherein the set of configuration directives is constructed to allow a platform to interpret directives that is understands and ignore directives it does not understand.

12. The machine accessible storage medium as recited in claim 11, wherein generating a set of configuration directives further causes the machine to:
collect a configuration binary for each of the plurality of platform types;
determine for each configuration policy a syntax corresponding to each of the plurality of platform types using the configuration binary corresponding to the platform type; and
create a set of configuration directives comprising directives constructed in at least one platform syntax language.

13. The machine accessible storage medium as recited in claim 11, wherein a format of the set of configuration directives is selected from a group of formats comprising a firmware image, a heterogeneous scripting language, a custom scripting language, and a combination of scripting languages.

14. The machine accessible storage medium as recited in claim 13, wherein the combination of scripting languages is capable of temporarily overriding a default language during interpretation for a single directive in another scripting language.

15. The machine accessible storage medium as recited in claim 14, wherein a globally unique identifier (GUID) indicates which scripting language is used for a corresponding configuration directive in the set of configuration directives.

16. The machine accessible storage medium as recited in claim 11, wherein the set of configuration directives is constructed to enable a target platform to download language support from a remote location in order to interpret the configuration directives.

17. The machine accessible storage medium as recited in claim 11, wherein the set of configuration directives is constructed to enable a target platform to interpret the configuration directives using a scripting agent which uses information in a human interface infrastructure database (HII DB).

18. The machine accessible storage medium as recited in claim 11, wherein the configuration binary for a platform type is constructed from uncompressed configuration data in a main firmware image corresponding to the platform type.

19. The machine accessible storage medium as recited in claim 11, wherein the configuration binary for a platform type is constructed during a firmware build process for the platform type.

20. The machine accessible storage medium as recited in claim 19, wherein constructing the configuration binary during the build further causes the machine to use at least one input selected from a group consisting of source files, string information and forms-based data, wherein source files are compiled using a source language compiler, string information is compiled with a string compiler, and forms-base data is compiled with a forms compiler.

21. A method for generating a configuration binary for a target platform, comprising:
constructing the configuration binary using information selected from a group of information consisting of a human interface infrastructure database (HII DB), a firmware image residing in a same memory as a boot firmware image, and compilation results during firmware build of a platform,
wherein HII DB information is extracted during platform runtime,
wherein firmware image information is extracted from uncompressed data on a FLASH memory to determine default settings for the target platform, and
wherein compilation results information is selected from a group consisting of processed source files, string information and forms-based data, and
wherein processing of data to obtain compilation results comprises compiling source files with a source language compiler, compiling string information with a string compiler, and compiling forms-base data with a forms compiler.

22. The method as recited in claim 21, wherein the HII DB stores information regarding a configuration of the target platform including internal representation forms (IFR) and language strings.

23. The method as recited in claim 21, wherein the configuration binary defines one of a default configuration and a current configuration for the target platform, and wherein configuration data retrieved from the firmware image represents a default configuration and data retrieved from the HII DB represents a current configuration.

24. A system for personality migration among target platforms, comprising:
a configuration server communicatively coupled to a plurality of target platforms, the configuration server to distribute configuration directives to the plurality of target platforms, wherein the configuration directives are in at least one format selected from a group of formats consisting of a firmware image, a custom scripting language, a neutral scripting language, and a combination of custom and neutral scripting languages,
wherein a target platform is constructed to act upon configuration directives that are understood by the target platform and ignore configuration directives that are not understood by the target platform.

25. The system for personality migration as recited in claim 24, wherein the distributed configuration directives comprise a heterogeneous scripting language constructed to identify at least one language for configuration directives using globally unique identifiers (GUID)s corresponding to each of the at least one language.

26. The system for personality migration as recited in claim 25, wherein the distributed configuration directives are constructed to allow temporary language overrides.

27. The system for personality migration as recited in claim 24, wherein a target platform retrieves a language-specific string pack from a remote location, the language-specific string pack used to interpret received configuration directives.

* * * * *